United States Patent
Watson (10) Patent No.: US 10,793,202 B2
(45) Date of Patent: Oct. 6, 2020

(54) TAILGATE GAP COVER

(71) Applicant: Toyota Motor Engineering & Manufacturing North America, Inc., Plano, TX (US)

(72) Inventor: Skylar C. Watson, Williamston, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 7 days.

(21) Appl. No.: 16/261,724

(22) Filed: Jan. 30, 2019

(65) Prior Publication Data

US 2020/0239085 A1 Jul. 30, 2020

(51) Int. Cl.
*B62D 33/03* (2006.01)
*B62D 33/027* (2006.01)

(52) U.S. Cl.
CPC ......... *B62D 33/03* (2013.01); *B62D 33/0273* (2013.01)

(58) Field of Classification Search
CPC ..... B62D 33/0273; B62D 33/03; E05C 17/36; E05C 17/365
USPC ....................................... 296/57.1
See application file for complete search history.

(56) References Cited

U.S. PATENT DOCUMENTS

| | | | |
|---|---|---|---|
| 4,763,945 A | 8/1988 | Murray | |
| 5,664,822 A * | 9/1997 | Rosenfield | B60R 13/01 16/250 |
| 5,904,391 A | 5/1999 | Liljenquest et al. | |
| 6,749,245 B1 * | 6/2004 | Walker | B62D 33/0273 296/57.1 |
| 6,749,250 B1 * | 6/2004 | Reid | B60R 13/00 296/136.07 |
| 9,016,753 B2 | 4/2015 | McDermott, III | |
| 9,862,430 B1 | 1/2018 | Stojkovic et al. | |
| 10,421,502 B2 * | 9/2019 | Smith | B62D 33/03 |
| 2002/0121794 A1 | 9/2002 | Vejnar | |
| 2012/0223541 A1 * | 9/2012 | Gianino | B62D 33/0273 296/57.1 |
| 2015/0041361 A1 * | 2/2015 | Hong | B65D 81/107 206/723 |
| 2015/0084361 A1 * | 3/2015 | McDermott, III | B62D 33/0273 296/57.1 |
| 2015/0344082 A1 * | 12/2015 | Keklak | B60R 13/06 16/250 |
| 2017/0246996 A1 | 8/2017 | Vu | |
| 2017/0247062 A1 * | 8/2017 | Vu | B62D 33/0273 |
| 2019/0241219 A1 * | 8/2019 | Smith | B62D 33/0273 |
| 2019/0322225 A1 * | 10/2019 | Smith | B62D 33/0273 |

* cited by examiner

*Primary Examiner* — Jason S Morrow
(74) *Attorney, Agent, or Firm* — Christopher G. Darrow; Darrow Mustafa PC (57) ABSTRACT

A vehicle tailgate can be being pivotally attached to a cargo area of the vehicle with a gap being defined between an edge of the tailgate and an end of the floor of the cargo area. Embodiments disclosed herein relate to a tailgate gap cover that can protect the gap between a tailgate and a vehicle cargo floor. In one embodiment, the disclosed cover includes a cover member having a first edge pivotally attached to the tailgate such that a second edge opposite the first edge rests on cargo area floor beyond the gap when the tailgate is in a raised position or a lowered position.

8 Claims, 7 Drawing Sheets

TAILGATE GAP COVER

TECHNICAL FIELD

The subject matter described herein relates generally to automotive accessories and, in particular, to a protective cover for a gap between a tailgate and a vehicle cargo floor.

BACKGROUND

Vehicles that have a hinged tailgate, such as trucks or sports utility vehicles (SUVs), typically have a gap between the tailgate and the vehicle cargo floor. The width of the gap normally increases when the tailgate is opened (e.g., swung into a lowered position). Dirt, sand, gravel, snow, loose material carried in the cargo space, or other types of debris may fall into and accumulate in the gap, which can interfere with operation of the tailgate and lead to a deterioration in functionality of the tailgate. The problem can be compounded during loading and unloading operations in which cargo is pushed or pulled over the gap, dragging the debris directly into the gap. Moreover, parts or ends of objects can fall in or catch the gap and create an awkward loading condition for the user, as the objects can jam in the gap rather than glide easily over the gap.

SUMMARY

Embodiments described herein disclose a tailgate gap cover that can protect a gap between a tailgate and a vehicle cargo floor, i.e., the tailgate being pivotally attached to a cargo area of the vehicle with the gap being defined between an edge of the tailgate and an end of the floor of the cargo area. For example, in one embodiment, the disclosed cover includes a cover member having a first end pivotally attached to the tailgate such that a second end opposite the first end rests on cargo area floor beyond the gap when the tailgate is in a raised position or a lowered position.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

This detailed description relates to protective covers for a gap between a tailgate and a vehicle cargo floor. Detailed embodiments are disclosed herein, however, it is to be understood that the disclosed embodiments are intended only as examples. Specific structural and functional details disclosed herein are not to be interpreted as limiting, but merely as a basis for the claims and as a representative basis for teaching one skilled in the art to variously employ the features described herein in virtually any appropriately detailed structure. Further, the terms and phrases used herein are not intended to be limiting but rather to provide an understandable description of possible implementations.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
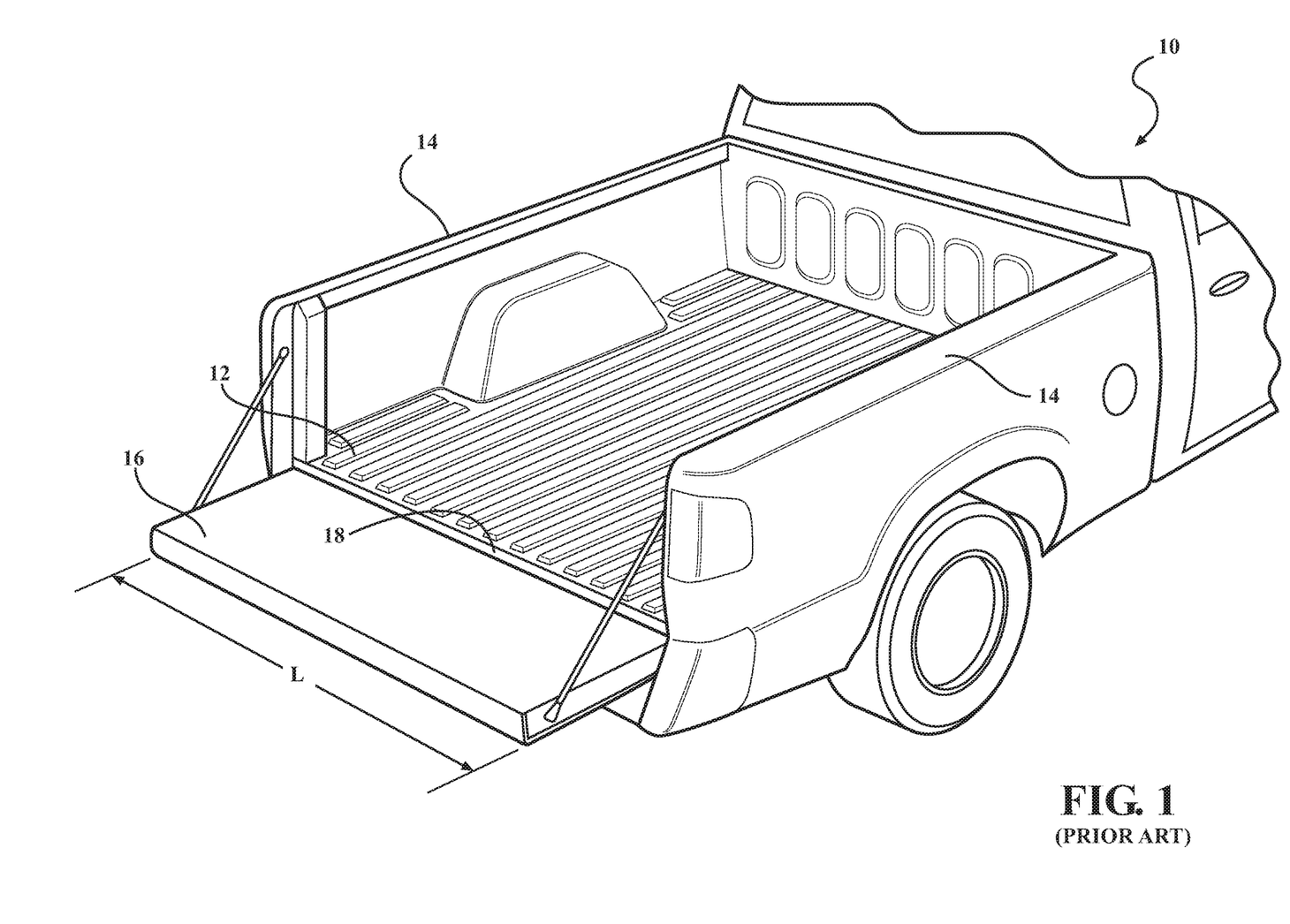
FIG. 1 illustrates a perspective view of an tailgate and cargo area of a truck.

In order to reduce the amount of debris that accumulates in a gap between a tailgate and a vehicle cargo floor, a tailgate gap cover is disclosed. FIG. 1 shows a pickup truck 10, which is an example vehicle having a cargo area defined by a floor (in this example, truck bed 12), sidewalls 14 and a tailgate 16. Although a pickup truck is shown the disclosed subject matter is not limited thereto but can also be applied to other vehicles that may have a tailgate, such as SUV's, station wagons, etc. The tailgate 16 is depicted in an "open", or "lowered", position. The truck bed 12 and tailgate 16 and are typically separated by a gap 18.

The gap 18 may exist in different sizes in different vehicles. While the precise width may vary depending on the construction of the tailgate 16 and truck bed 12, typically the gap 18 will extend between the sidewalls 14 at a length approximately equal to the cross-sectional length L of the tailgate 16.

Figure 2:
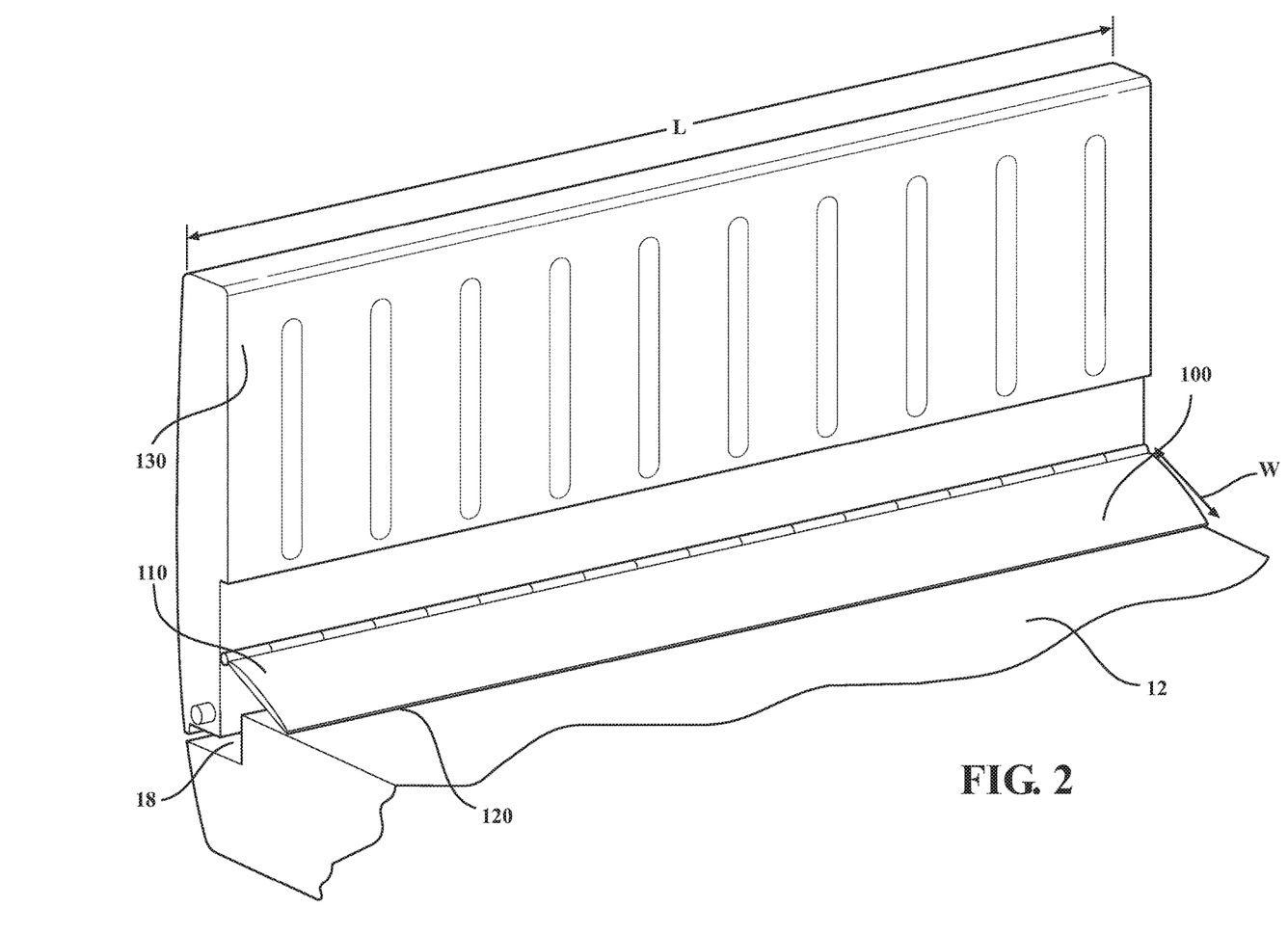
FIG. 2 illustrates a perspective view of an embodiment of a tailgate gap cover according to the disclosed subject matter.

FIG. 2 shows an embodiment of a tailgate gap cover 100 according to the disclosed subject matter. The cover 100 includes a first edge 110 pivotally attached to a tailgate 130, which may be similar to the tailgate 16, such that a second edge 120 opposite the first edge 110 rests on the cargo area floor of the truck bed 12 beyond the gap 18, whether the tailgate 130 is in a raised position or a lowered position. The cover 100 can be made of a same material as the floor of the cargo area to provide a continuous look. As shown in FIG. 2, the cover 100 can have a length that is substantially equal to the cross-sectional length L of the tailgate 130 to which it is attached. The cover 100 has a width W that is greater than the width of the gap 18 and thereby allows it to extend over the gap 18 at an angle and rest on the truck bed 12. Accordingly, the cover 100 has a width W and length L sufficient to substantially cover the entirety of the gap 18.

Figure 3A:
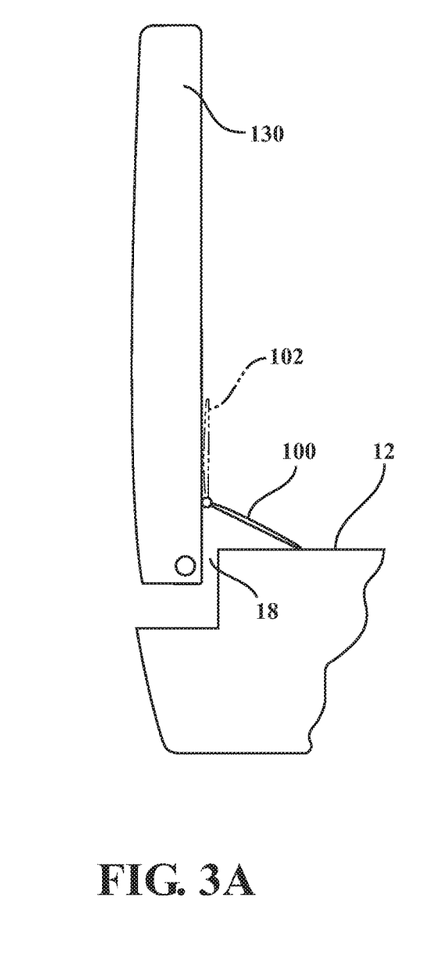
FIG. 3A illustrates a cut-away side view of an embodiment of a tailgate gap cover according to the disclosed subject matter with the tailgate in a closed position.
Figure 3B:
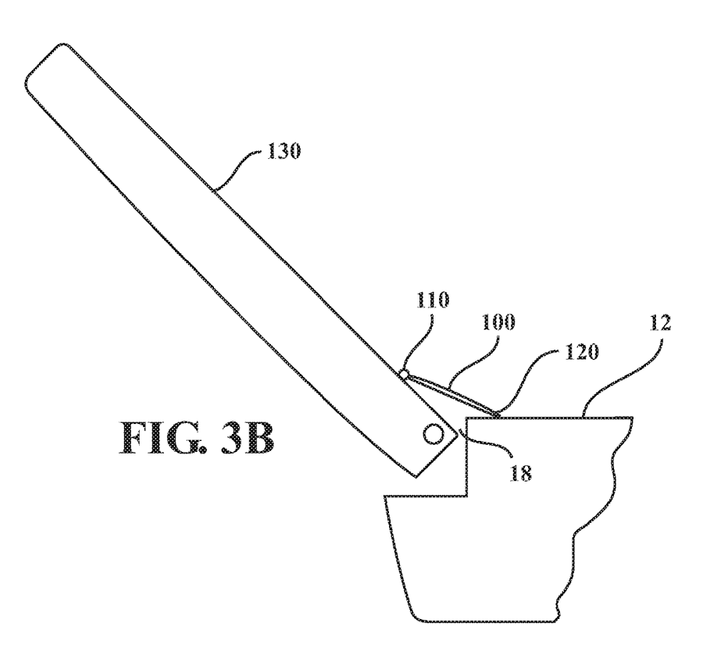
FIG. 3B illustrates a cut-away side view of an embodiment of a tailgate gap cover according to the disclosed subject matter with the tailgate between a closed and an open position.
Figure 3C:
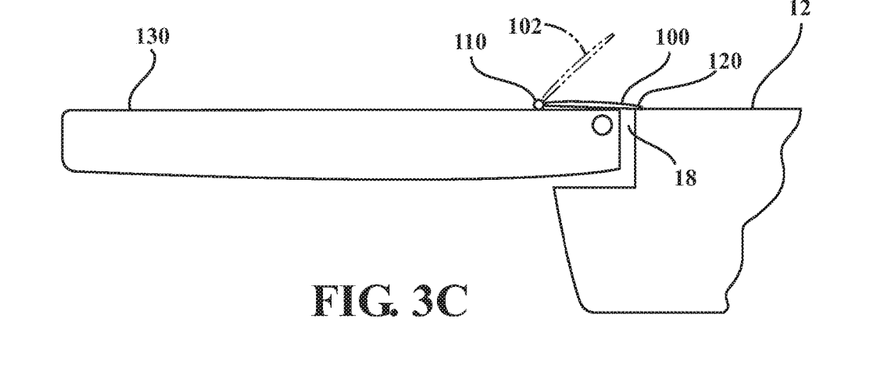
FIG. 3C illustrates a cut-away side view of an embodiment of a tailgate gap cover according to the disclosed subject matter with the tailgate in an open position.

FIGS. 3A-3C show side views of the tailgate 130 in different positions in conjunction with a tailgate gap cover 100 according to the disclosed subject matter. FIG. 3A shows the tailgate 130 in a "closed", or "raised", position, with the cover 100 extending past the gap 18 to rest on the truck bed 12. FIG. 3B shows the tailgate 130 moving between a "closed" position and an "open" position. During the transition the cover 100 continues to cover the gap 18 and the second edge 120 of the cover 100 continues to rest on the truck bed 12 while the first edge 110 moves in conjunction with the tailgate 130. FIG. 3C shows the tailgate 130 in an "open" or "lowered" position. The cover 100 rests on top of the tailgate 130 and the truck bed 12, covering the gap 18. Thus, through the full range of positions of the tailgate 130 the cover 100 can continually protect the gap 18 from any debris that may be in the cargo area.

The tailgate gap cover 100 can include a biasing mechanism (not shown), such as a spring, that biases the second edge 120 of the cover 100 toward the truck bed 12, or can rely on natural gravity to bias the second edge 120 of the cover 100 toward the truck bed 12.

The side-profile shape of the tailgate gap cover 100 can be rectangular, oval, triangular, any combination thereof, or another shape. As shown in FIG. 3C, in one embodiment the first edge 110 and the second edge 120 of the cover 100 can be tapered to have a lower height than a middle portion of the cover thereby reducing obstruction of sliding large objects into and out of the cargo area. In another embodiment, the cover 100 can be disposed at least partially in a recess in the tailgate 130 to further reduce the likelihood of the cover 100 creating a loading obstruction.

Although the disclosed tailgate gap cover 100 provides improved protection for the gap 18, some amount of dirt or debris may still manage to accumulate in the gap 18. Accordingly, as shown in FIGS. 3A and 3C, the cover 100 can be rotated from a resting position to a raised position 102 to allow direct access to the gap 18, e.g., to allow a user to clear out any debris that slipped through.

In some circumstances it may be useful for a user to be able to keep the tailgate gap cover 100 in a raised position to facilitate cleaning, airing out the gap, etc. Accordingly, the disclosed embodiments can include a device configured to hold the cover 100 in the raised position. For example, the cover 100 can be a part of a tailgate gap cover system that includes a holding mechanism to affix the cover 100 to the tailgate 130 when the cover member is pivoted to a raised position, i.e., a position in which the second edge of the cover 100 is in contact with or substantially near contact with the tailgate 130.

Figure 4A:
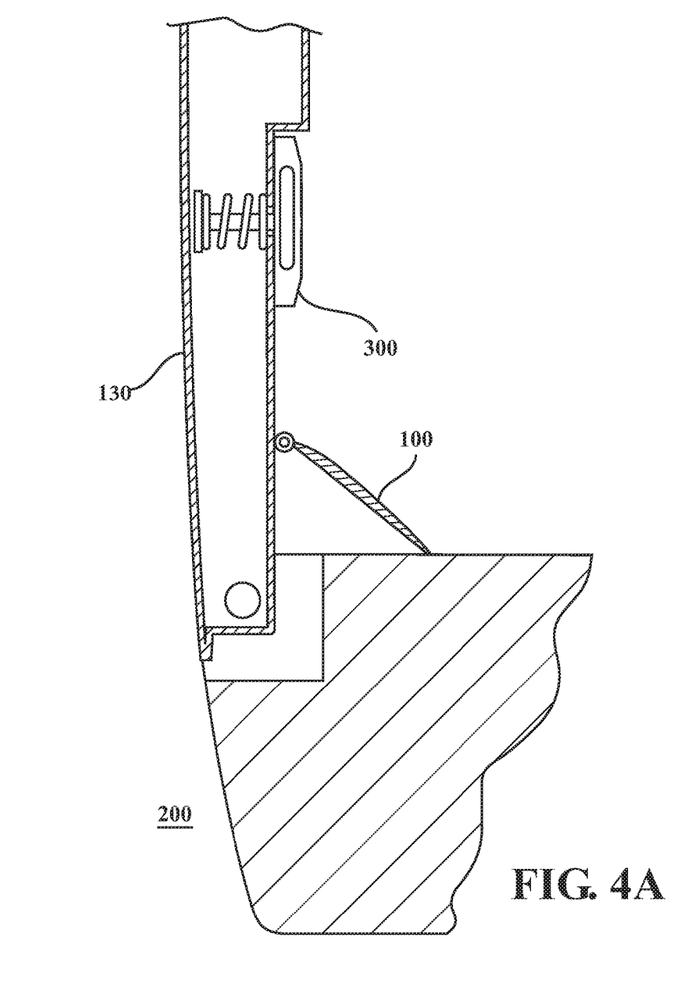
FIG. 4A illustrates a cut-away side view of a tailgate gap cover system including a holding mechanism according to the disclosed subject matter.
Figure 4B:
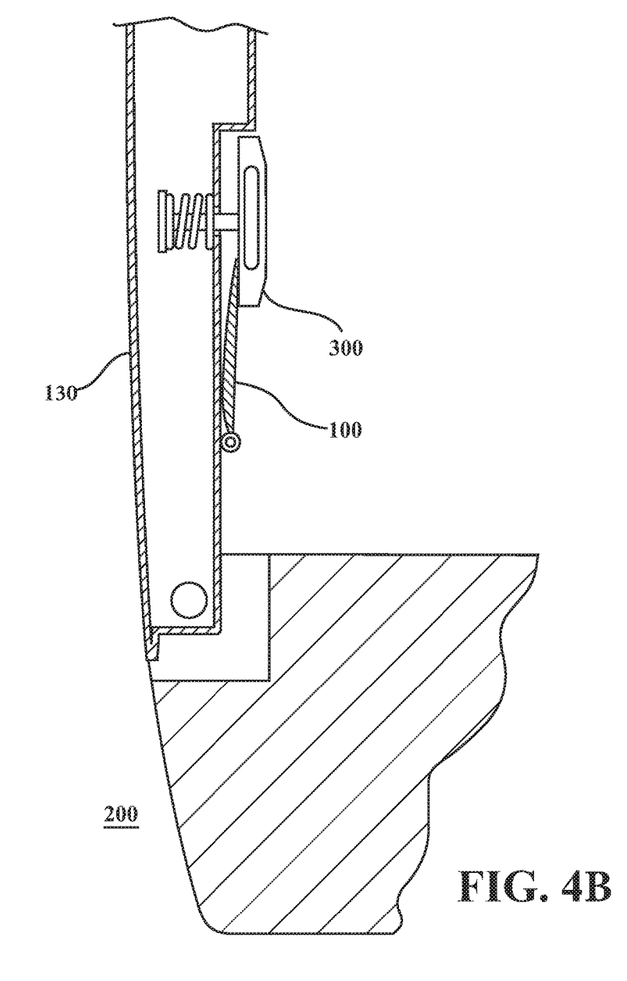
FIG. 4B illustrates a cut-away side view of a tailgate gap cover system including a holding mechanism holding a tailgate gap cover according to the disclosed subject matter.

FIGS. 4A-4B show a side view of an embodiment of a system 200 including a holding mechanism 300 for holding the tailgate gap cover 100 in a raised position 102. The holding mechanism 300 is shown as a twist lever, however, the scope of the disclosed subject matter is not limited thereto. Other types of holding mechanisms can be used, such as latches, sliding locks, chain fasteners, etc.

Figures 5, 6:
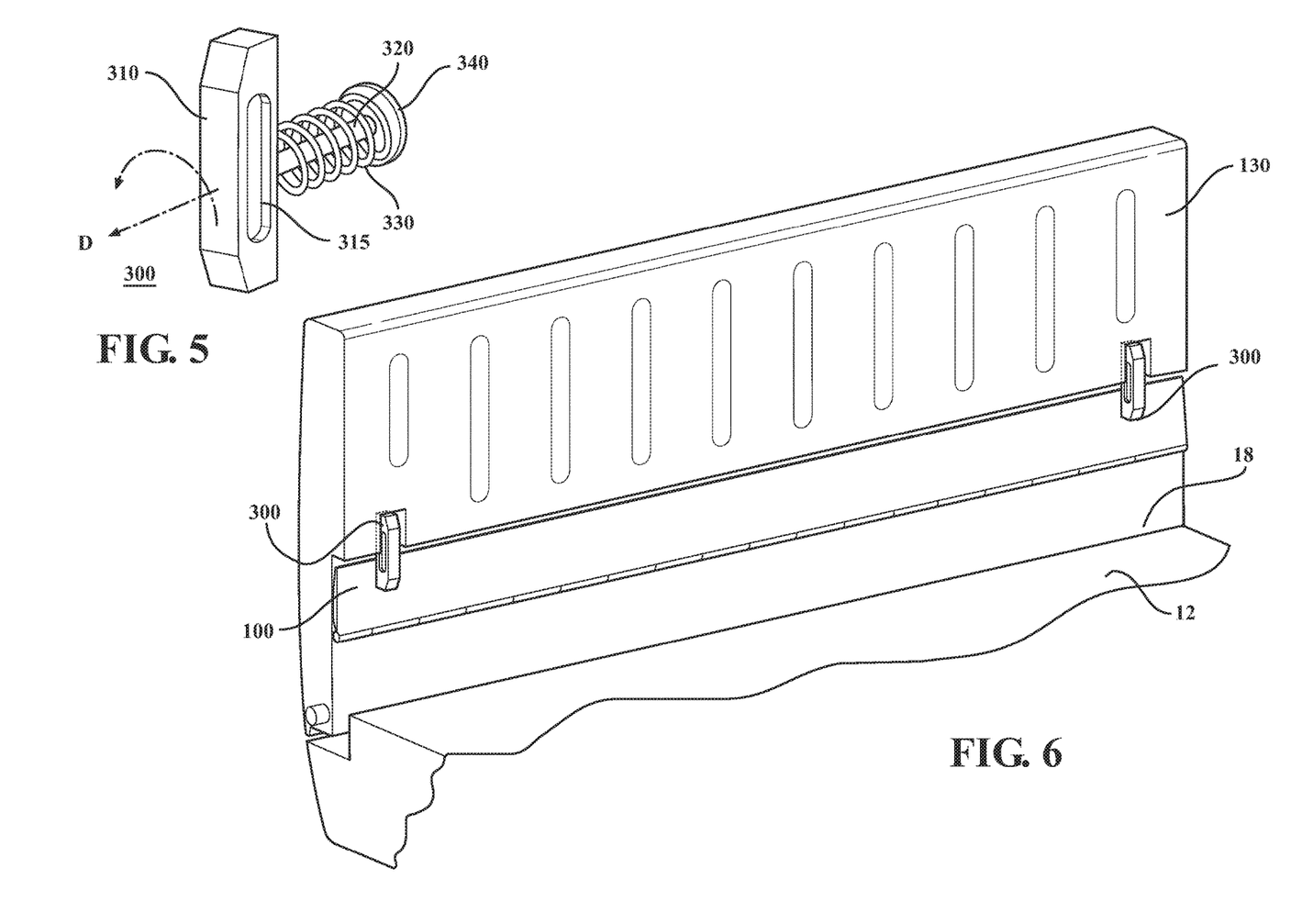
FIG. 5 illustrates a twist lever according to the disclosed subject matter.
FIG. 6 illustrates a perspective view of a twist levers holding a tailgate gap cover according to the disclosed subject matter.

FIG. 5 shows an isolated view of the disclosed twist lever 300. The twist lever 300 includes a lever 310 mounted on a shaft 320. The lever 310 can include a recess 315 for a user to easily grip. A coil spring 330 biases the lever 310 toward a base 340. From this configuration a user can pull the lever in the direction D and rotate the lever around the axis of the shaft 320 to place the lever 310 in a release position to release a tailgate gap cover or in a hold position to hold a tailgate gap cover. As shown in FIG. 6, more than one twist lever 300 can be installed on a tailgate 130 to stably hold a tailgate gap cover 100 and allow for direct access to the gap 18.

Figure 7:
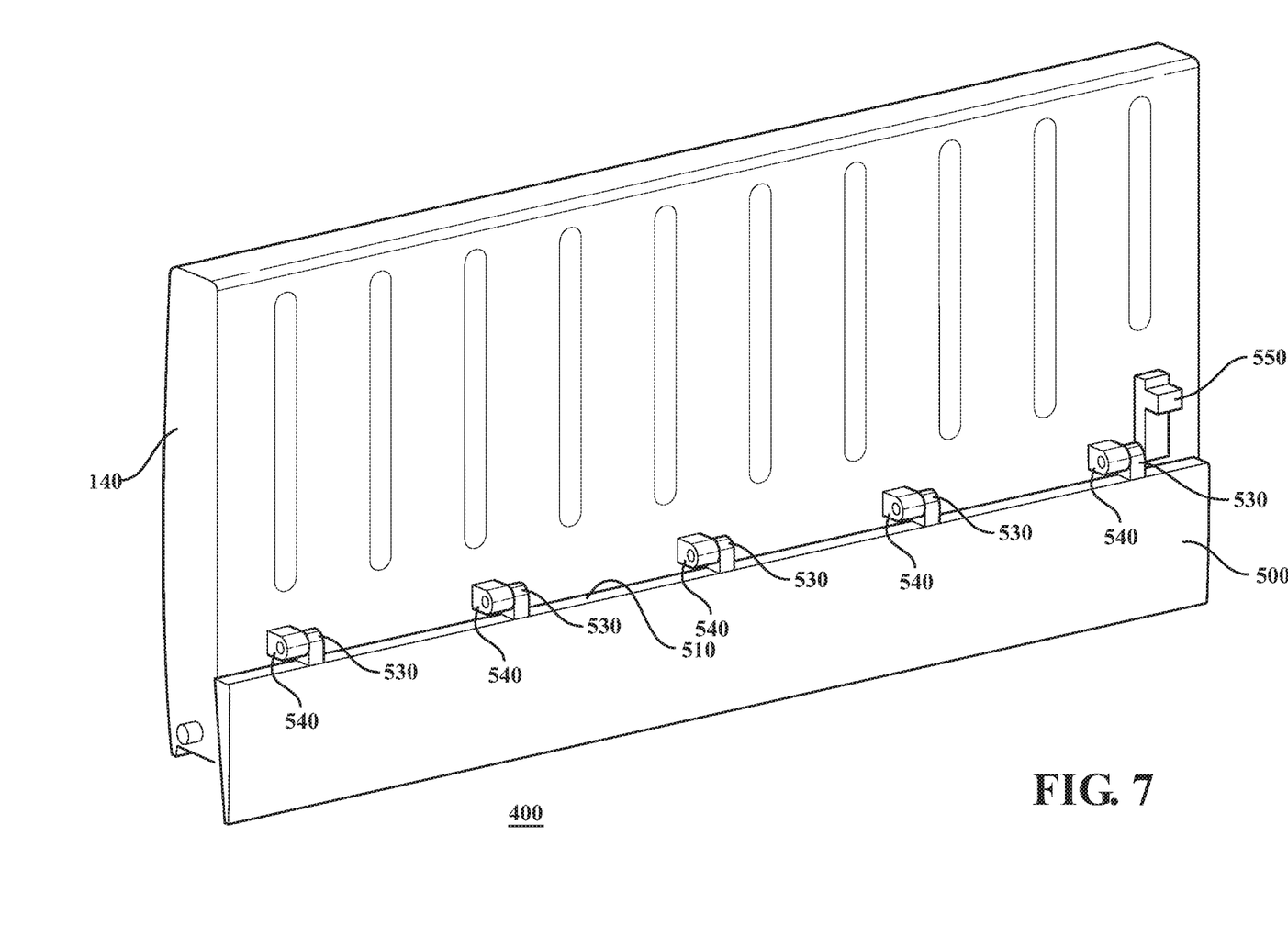
FIG. 7 illustrates a perspective view of a removable tailgate gap cover according to the disclosed subject matter.

In some situations it may be beneficial for a user to be able to completely remove the disclosed tailgate gap cover, e.g., for repairs or for storage when not needed. FIG. 7 shows an embodiment of a system 400 with a removable tailgate gap cover 500. The cover 500 includes a plurality of protrusions 530 on a first edge 510 of the cover. Each protrusion 530 holds a respective pin (not shown) oriented parallel to the first edge 510. The tailgate 140 includes a plurality of pin receivers 540 into which the pins held by the protrusions 530 may be laterally inserted. A slidable tab 550 may be biased toward a position that prevents the cover 500 from moving laterally in a direction that would dislodge the pins from the pin receivers 540.

Figure 8A:
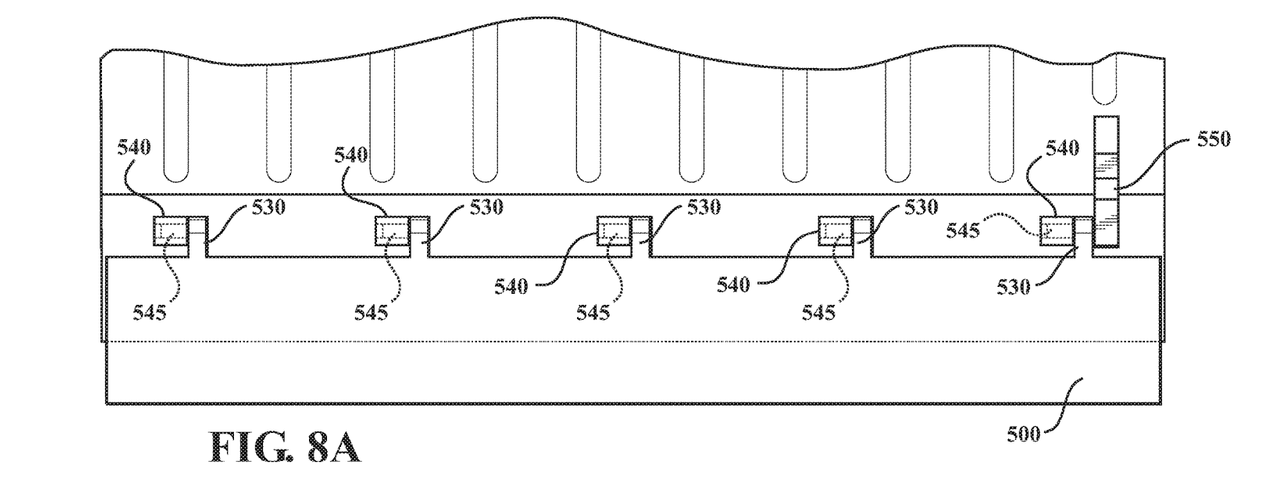
FIG. 8A illustrates a first lateral position of a removable tailgate gap cover according to the disclosed subject matter.
Figure 8B:
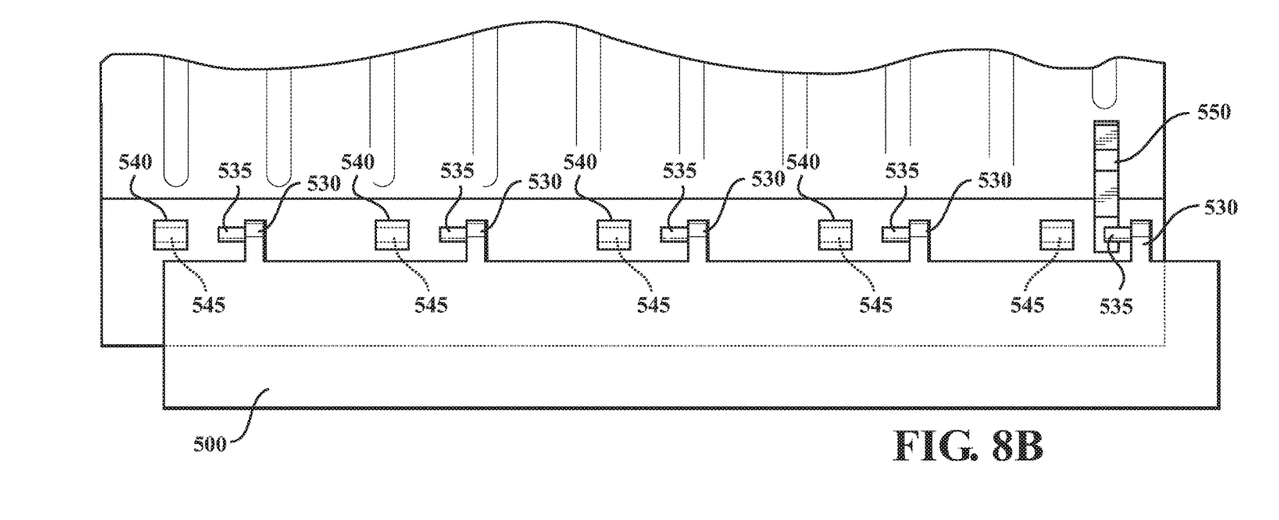
FIG. 8B illustrates a second lateral position of a removable tailgate gap cover according to the disclosed subject matter.

FIGS. 8A-8B show removal of the tailgate gap cover 500. In FIG. 8A the pins (not shown) held by the protrusions 530 are inside channels 545 of the pin receivers 540. The slidable tab 550 is in a first position which holds the cover 500 in place. That is, the pin receiver 540 prevents the protrusion 530 from lateral movement in one direction while the tab 550 prevents the protrusion 530 from lateral movement in the opposite direction. The tab 550 can be biased toward the first position, for example, by a spring or other biasing mechanism In FIG. 8B the slidable tab 550 is shifted into a second position that does not obstruct the lateral movement of the tailgate gap cover 500. The user can now freely push the cover 500 in a lateral direction, i.e., push the protrusions 530 laterally away from the pin receivers 540, thereby removing the pins 535 from the channels 545 and allowing the cover 500 to completely removed.

Accordingly, the slidable tab 550 has a first position which prevents at least one of the plurality of protrusions from lateral movement after insertion of the pins, and a second position which allows the at least one of the plurality of protrusions to freely move laterally for insertion or removal of the pins.

Aspects herein can be embodied in other forms without departing from the spirit or essential attributes thereof. Accordingly, reference should be made to the following claims, rather than to the foregoing specification, as indicating the scope hereof.

What is claimed is:

1. A tailgate gap cover system for a tailgate of a vehicle, the tailgate being pivotally attached to a cargo area of the vehicle with a gap being defined between an edge of the tailgate and a floor of the cargo area, the system including a tailgate gap cover comprising:
   a cover member, having a first edge pivotally attached to the tailgate such that a second edge opposite the first edge rests on the cargo area floor beyond the gap when the tailgate is in a raised position or a lowered position, wherein the cover member is disposed in a recess in the tailgate.

2. A tailgate gap cover system for a tailgate of a vehicle, the tailgate being pivotally attached to a cargo area of the vehicle with a gap being defined between an edge of the tailgate and a floor of the cargo area, the system including a tailgate gap cover comprising:
   a cover member, having a first edge pivotally attached to the tailgate such that a second edge opposite the first edge rests on the cargo area floor beyond the gap when the tailgate is in a raised position or a lowered position,
   wherein the tailgate includes a holding mechanism to affix the cover member to the tailgate when the cover member is pivoted to a position such that the second edge is in contact or substantially near contact with the tailgate.

3. The tailgate gap cover system of claim 1, wherein the holding mechanism is a twist lever.

4. The tailgate gap cover system of claim 1, wherein the cover member is made of same material as the floor of the cargo area.

5. The tailgate gap cover system of claim 1, wherein a length of the cover member is substantially equal to a length of the tailgate of the vehicle, and a width of the cover member is greater than a width of the gap.

6. The tailgate gap cover system of claim 1, wherein the cover member includes a biasing mechanism that biases the second edge of the cover member toward the floor of the cargo area.

7. The tailgate gap cover system of claim 1, wherein the first edge and the second edge of the cover member are tapered to have a lower height than a middle portion of the cover member.

8. A tailgate gap cover system for a tailgate of a vehicle, the tailgate being pivotally attached to a cargo area of the vehicle with a gap being defined between an edge of the tailgate and a floor of the cargo area, the system including a tailgate gap cover comprising:
   a cover member, having a first edge pivotally attached to the tailgate such that a second edge opposite the first edge rests on the cargo area floor beyond the gap when the tailgate is in a raised position or a lowered position,
   wherein:
      the cover member includes a plurality of protrusions on the first edge, each protrusion holding a respective pin oriented parallel to the first edge; and
      the tailgate includes a plurality of pin receivers having channels into which the respective pins can be laterally inserted to allow the cover member to pivot thereon, and a slidable tab having a first position which prevents at least one of the plurality of protrusions from lateral movement after insertion of the pins, and a second position which allows the at least one of the plurality of protrusions to freely move laterally for insertion or removal of the pins.

\* \* \* \* \*